United States Patent [19]

Oliver

[11] Patent Number: 5,017,869
[45] Date of Patent: May 21, 1991

[54] SWEPT FREQUENCY EDDY CURRENT SYSTEM FOR MEASURING COATING THICKNESS

[75] Inventor: David W. Oliver, Ballston Lake, N.Y.

[73] Assignee: General Electric Company, Schenectady, N.Y.

[21] Appl. No.: 450,752

[22] Filed: Dec. 14, 1989

[51] Int. Cl.⁵ .................... G01B 7/10; G01N 27/72; G01R 33/12
[52] U.S. Cl. .................. 324/230; 324/232; 324/233; 324/234
[58] Field of Search ............... 324/229-231, 324/232-234

[56] References Cited

U.S. PATENT DOCUMENTS

| | | | |
|---|---|---|---|
| 2,916,694 | 12/1959 | Hanysz et al. | 324/230 |
| 3,407,352 | 10/1968 | Smith | 324/230 |
| 3,441,840 | 4/1969 | Randle | 324/230 X |
| 3,878,457 | 4/1975 | Rodgers | 324/229 |
| 4,752,739 | 6/1988 | Wang | 324/230 |
| 4,893,079 | 1/1990 | Kustra et al. | 324/230 X |

FOREIGN PATENT DOCUMENTS 564585 11/1977 U.S.S.R. .................... 324/230

OTHER PUBLICATIONS

Hanysz, Eugene A.; Swept Frequency Eddy-Current Device to Measure Overlay Thickness, The Review of Scientific Instruments; vol. 29, No. 5, May 1958 pp. 411-415.

Primary Examiner—Gerard R. Strecker
Attorney, Agent, or Firm—Paul R. Webb, II; James C. Davis, Jr.

[57] ABSTRACT

An apparatus for measuring the thickness of a coating on a substrate has a bridge circuit including four coils. One coil is placed near the coated substrate and another placed near an uncoated substrate of the same material. An oscillator is connected to the bridge circuit and frequency sweeps, e.g. from 10 KHz to 10 MHz. Phase differences between the voltages induced in the coils are detected to determine conductivity changes with frequency. A method for measuring coating thickness comprises generating variable frequency eddy current in coated and uncoated substrates of the same material and comparing the generated eddy current.

33 Claims, 3 Drawing Sheets

SWEPT FREQUENCY EDDY CURRENT SYSTEM FOR MEASURING COATING THICKNESS

BACKGROUND OF THE INVENTION

The present invention relates to measuring coating thickness, and more particularly, to using eddy current apparatus with a swept frequency oscillator.

When substrate parts are coated with thin layers, it is important to control the layer thickness. When the coating has physical properties, e.g., acoustic impedance or electrical resistivity, which are distinctly different from the substrate, control of layer thickness is done with standard techniques, such as ultrasound or fixed frequency eddy currents. However, in coating some substrate parts, the substrate and coating materials differ only slightly, e.g., the coating of zircalloy tubing with zirconium metal. Thus, the difference in physical properties is slight, which makes determining coating thickness difficult.

It is therefore an object of the present invention to determine coating thickness, especially when the differences in physical properties of the coating and the substrate are small.

SUMMARY OF THE INVENTION

In brief, this and other objects are achieved by apparatus in accordance with the invention for measuring the thickness of a coating on a substrate having a given substrate material, comprising means for generating variable frequency eddy currents in the coated substrate, the coating, and an uncoated substrate of the given material; and means for comparing conductivity changes of the coating and the coated substrate with the uncoated substrate with changes in frequency.

A method in accordance with the invention for measuring the thickness of a coating on a substrate having a given substrate material, comprises generating variable frequency eddy currents in the coated substrate, the coating, and an uncoated substrate of the given material; and comparing changes in conductivity of the coating and the coated substrate with the uncoated substrate with changes in frequency.

DETAILED DESCRIPTION

Figure 1:
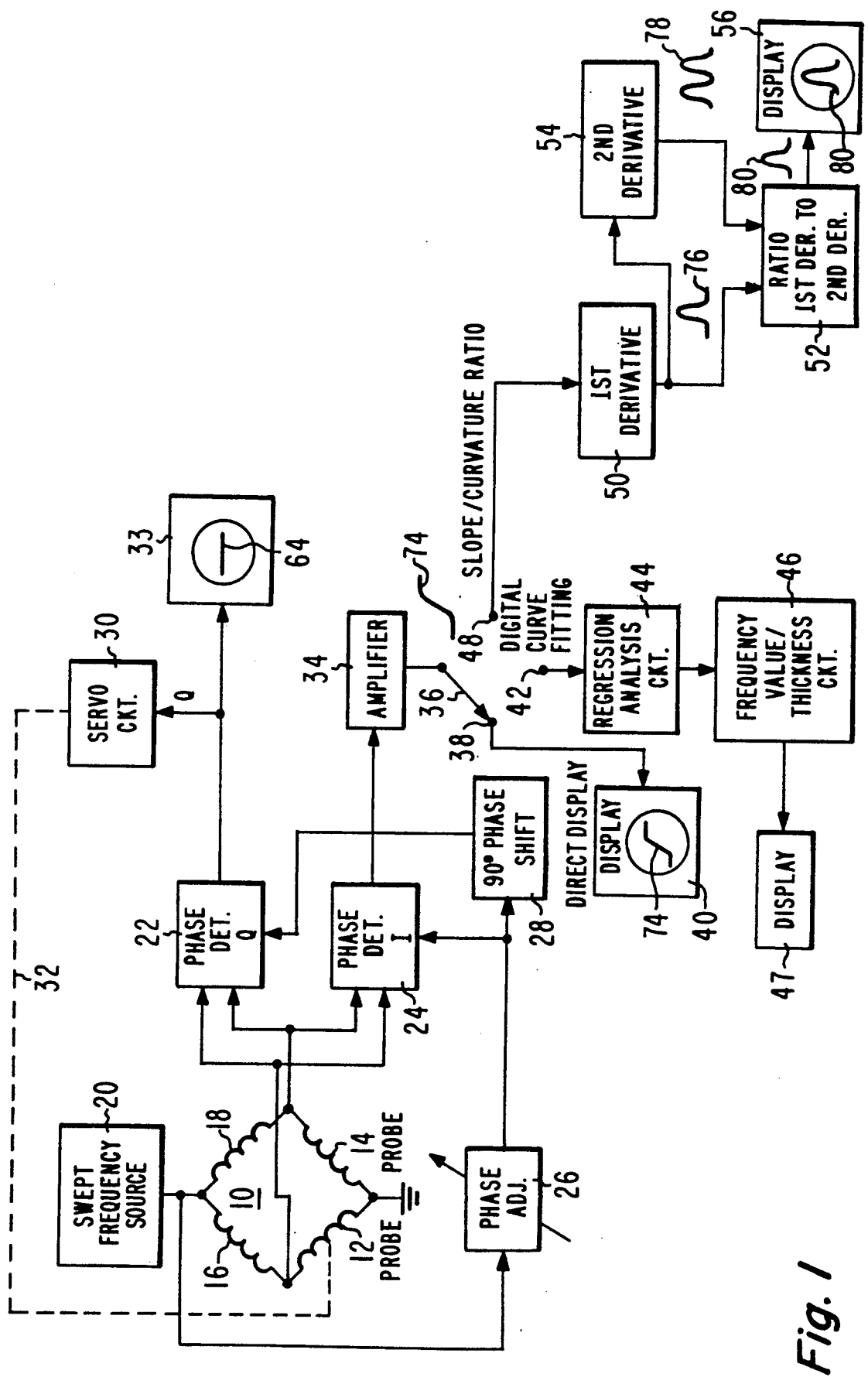
FIG. 1 is a block diagram of an embodiment of the invention.

FIG. 1 shows a bridge circuit 10 including probe coils 12 and 14 each having one end grounded. Bridge 10 also comprises inductances 16 and 18 that are respectively coupled to the remaining ends of probes 12 and 14. While inductances 16 and 18 can be replaced with resistors or capacitors, it is preferable that they be inductances so that the sensitivity of bridge 10 is maintained over a wide frequency range. A swept frequency signal source or oscillator 20 is coupled to the remaining ends of inductances 16 and 18. Source 20 has a typical frequency sweep of between about 10 KHz to 10 MHz, with a sweep rate of about 30 Hz, although other frequencies can be used. Preferably, source 20 is a constant current (high output impedance) source in order to further help maintain bridge sensitivity over the swept frequency range.

Comparison means, such as phase detectors 22 and 24, each have a pair of inputs respectively coupled to the junction of coils 12 and 16 and also to the junction of coils 14 and 18. Source 20 provides a signal to the input of a phase adjuster 26. The output signal from adjuster 26 is directly applied to an input of detector 24 and also to the input of a 90 degree phase shift circuit 28; the output signal from circuit 28 is applied to detector 22. Thus detector 22 is the Q (quadrature) channel phase detector, while detector 24 is the I (in-phase) channel phase detector.

As known in the art, detectors 22 and 24 can each comprise a diode bridge with the differential signal from probes 12 and 14 and from source 20 as input signals. An output signal from the bridge is applied to a resistance-capacitance low pass filter. This filter should have a time constant longer than the period of the low frequency limit of the frequency sweep, e.g., 1/10 KHz, and shorter than the period of the sweep rate, e.g., 1/30 Hz. Phase detectors 22 and 24 essentially pass the differential signal from probes 12 and 14 if it is in phase with that of the reference oscillator signal applied to the respective detector and do not pass the differential input signal if it is out of phase therewith.

The output signal from Q channel detector 22 is applied to a servo circuit 30, which includes a mechanical manipulator (not shown) for controlling the position of probe 12 as shown by dotted line 32. The output signal from Q channel detector 22 is also applied to the vertical axis input of a CRT display 33, which has a horizontal axis time sweep synchronized with the frequency sweep of source 20.

The output signal from I channel detector 24 is applied to the input of an amplifier 34, which amplifier provides an output signal to switch 36. When switch 36 engages contact 38 for a direct display mode, the amplifier 34 output signal is applied to the vertical axis input of a CRT display 40, which also has a horizontal axis time sweep synchronized with the frequency sweep of source 20 in order to display a transition frequency (explained below).

When switch 36 engages contact 42, a digital curve fitting mode is selected. Amplifier 34 output signal is applied to a regression analysis circuit 44, which can comprise a microprocessor programmed to perform a least squares fit, maximum likelihood technique, etc., as known in the art, in order to determine the transition frequency. A hardwired circuit could also be used. The transition frequency output signal from circuit 44 is applied to a circuit 46, e.g., a ROM, that has been calibrated with a table of coating thickness versus transition frequencies (explained below). The coating thickness output signal from circuit 46 is applied to a display 47, which can be either an analog or digital display of the coating thickness.

When switch 36 engages contact 48, amplifier 34 output signal is applied to a differentiator 50 to compute the first derivative of the output signal. The output signal from differentiator 50 is applied to a ratio circuit 52, which can comprise a microprocessor programmed to compute a ratio. Hardwired digital and analog circuits for computing ratios can also be used as is known in the art. The output signal from differentiator 50 is also applied to differentiator 54 in order to compute the second derivative of the amplifier 34 output signal. The output signal from differentiator 54 is applied to ratio circuit 52. The output signal from ratio circuit 52 is applied to the vertical axis input of a CRT display 56, which also has a horizontal axis time sweep synchronized with the frequency sweep of source 20. It will be seen that displays 33, 40 and 56 can be the same display with a switch (not shown) switching the input of the display between the outputs of circuits 22, 34 or 52 in accordance with the position of switch 36 or the phase adjust operation (described below). A dual trace oscilloscope can also be used as the display.

Figure 2A:
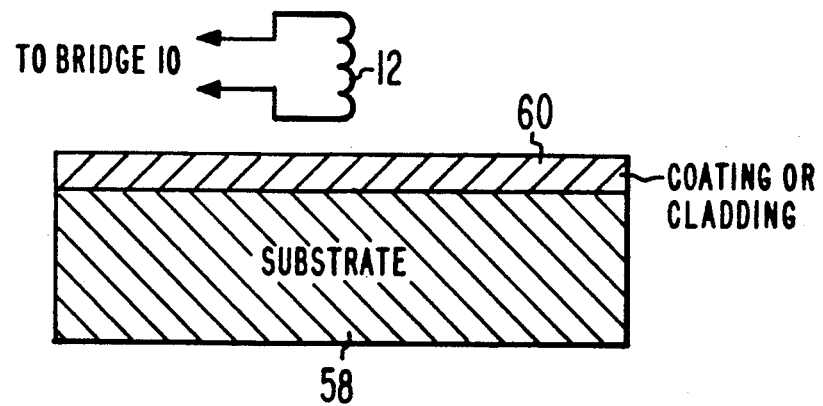
FIGs. 2a and 2b are cross-sectional views of the disposition of probe coils used in FIG. 1.
Figure 2B:
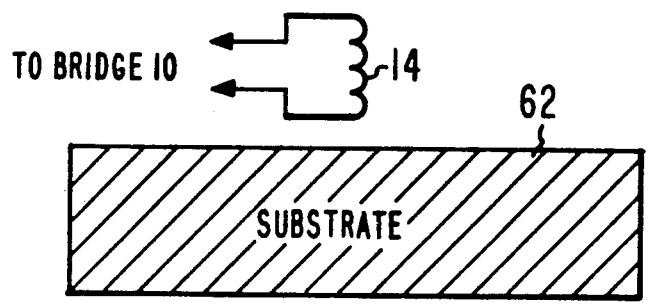

As shown in FIG. 2(a), during the first operation, called "phase adjust", probe 12 is placed near, and the coil axis preferably perpendicular to, a substrate 58 having a coating or cladding 60 of either known or unknown thickness. Probe 14 is placed near, and the coil axis perpendicular to, an uncoated reference substrate 62 of the same material as substrate 58, as shown in FIG. 2(b). In general, substrates 58 and 62 and coating 60 can be any conductive material, e.g. metals, conductive plastics, composite materials, etc. Both probes 12 and 14 and substrates 58 and 60 are normally motionless. A swept frequency signal is generated by source 20 that creates eddy currents in substrates 58 and 62 and coating 60 in accordance with their respective conductivities at the instantaneous frequency. Q channel phase detector 22 compares these conductivities by comparing the magnitude and phase of the voltages the eddy currents generate in coils 12 and 14, which comparison is displayed on display 33. Phase adjustment circuit 26 is then adjusted in order to give the most horizontal possible display line 64 on display 33, i.e., the minimum possible sensitivity of Q channel detector 22 to differences in conductivity changes. This approximately corresponds to the maximum sensitivity of I channel detector 22 to differential conductivity changes of substrates 58 and coating 60 compared to substrate 62 and also to the maximum sensitivity of Q channel detector 22 to changes in the distance between probe 12 and the substrate 58. Such later changes are called "lift-off".

Figure 3:
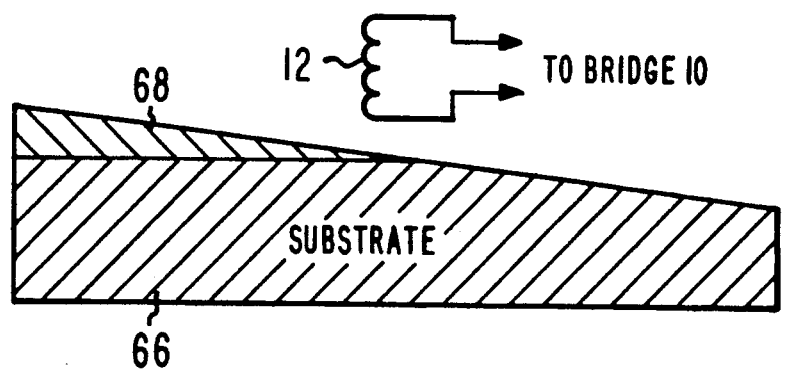
FIG. 3 is a cross-sectional view of an angle block used to calibrate the invention.
Figure 4:
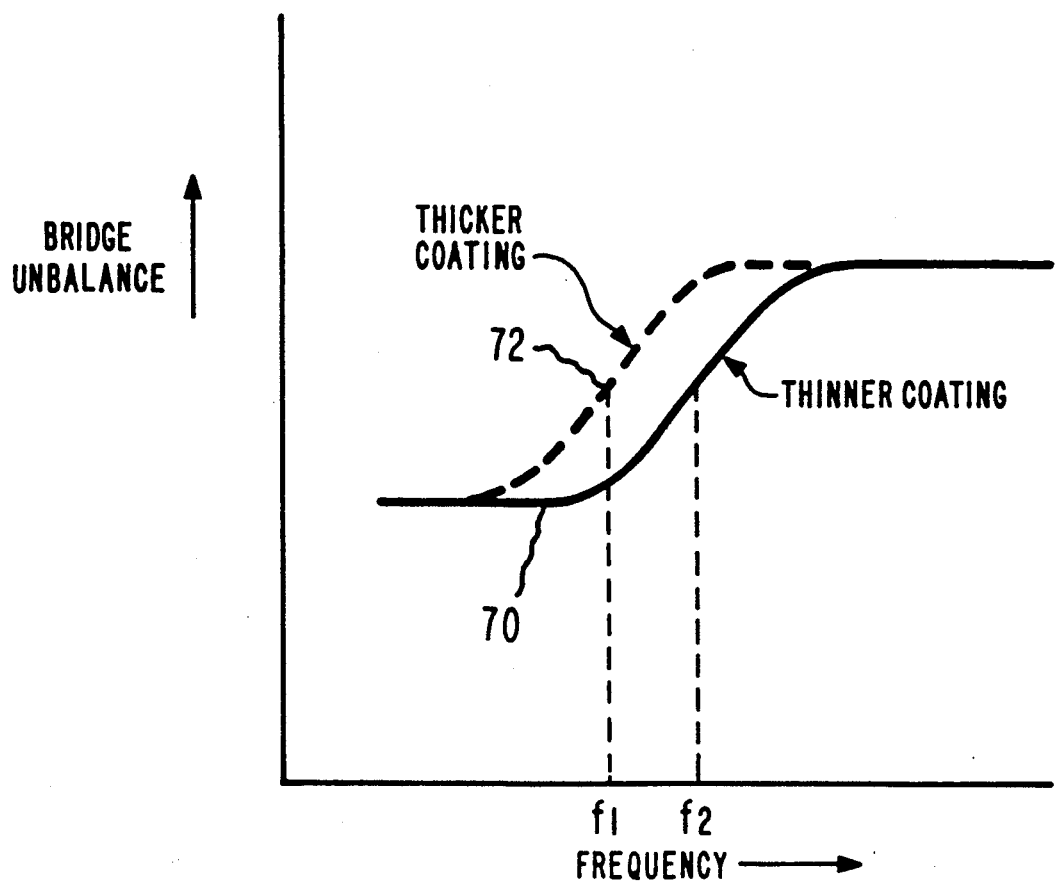
FIG. 4 is a graph of a signal in the embodiment of FIG. 1.

The next step is calibration, and, as shown in FIG. 3, probe 12 is disposed proximate a substrate 66 having an angle lapped wedge-shaped coating 68. The thickness of coating 68 varies in a known manner with distance along substrate 66. Instead of being wedge-shaped, coating 68 can be staircase (step) shaped with the steps of known thickness. Probe 14 is still disposed as shown in FIG. 2(b). Source 20 is activated and its frequency is swept. When probe 12 is near a thin portion of coating 68 and the frequency is low, eddy currents penetrate both coating 68 and substrate 66. Thus the signals from probes 12 and 14 are nearly equal and bridge 10 is nearly in balance since probes 12 and 14 are essentially respectively measuring the conductivity of substrates 66 and 62, which are equal. As the frequency is raised, the balance initially remains constant, but eventually the skin effect causes less and less of the eddy currents to penetrate substrate 66 and bridge imbalance increases, see curve 70 in FIG. 4. Finally, the imbalance levels off since the conductivity primarily of coating 68 is being measured. Half way between these two level portions of curve 70 is a transition frequency $f_2$, which occurs where the thickness of coating 68 is about equal to the skin depth. Since the coating thickness is known, a calibration point of frequency versus thickness is obtained and stored in circuit 46 and the horizontal axes of displays 40 and 56 are calibrated. Probe 12 is then moved to be disposed near a thicker portion of coating 68 and the process repeated as shown by curve 72. This time a new transition frequency $f_1$, is obtained, wherein $f_2$ is greater than $f_1$. The new calibration point is stored in circuit 46 and the horizontal axes of displays 40 and 56 are calibrated. This process is repeated several times until a sufficient number of calibration points are obtained. Obviously, a thick coating can be first used for calibration and then thinner coatings.

The next step is to use the apparatus of the invention to measure the thickness of an unknown coating by disposing probe 12 near a substrate 58 having a coating 60 of unknown thickness, as shown in FIG. 2(a). Probe 12 is slowly scanned in a one or two dimensional pattern over substrate 58. Alternatively, substrate 58 can be moved while probe 12 is stationary, or some combination of both motions can be used especially for a two dimensional scan wherein one of said motions can be in one direction and the other motion can be perpendicular to said one direction. By "slowly" is meant that this mechanical scan is slow compared to the sweep rate of source 20. If desired, during this scan the output signal from Q-channel detector 22 can be used to control servo circuit 30 which in turn keeps the distance between probe 12 and substrate 58 substantially a constant, i.e., minimizes lift-off, for more accurate thickness measurements. Probe 14 is still disposed as shown in FIG. 2(b).

Amplifier 34 provides a signal such as shown by numeral 74 in FIG. 1. If the direct display mode is chosen by switch 36, signal 74 will be displayed by display 40. If the digital curve fitting mode is chosen, regression analysis circuit 44 determines the transition frequency of best fit to the signal 74. Then a signal representing this frequency is applied to circuit 46 and a thickness corresponding to this frequency is read out and displayed by display 47.

If the slope-curvature ratio mode is selected, then bridge imbalance is not directly used but the first derivative of signal 74 is calculated by circuit 50 as shown by signal 76. Then the second derivative of signal 74 is calculated by circuit 54 as shown by signal 78. The ratio of signal 76 to that of signal 78 is then calculated by circuit 52. At high and low frequencies the first derivative is small. At the transition frequency the derivative is large and the second derivative goes to zero. The ratio is a maximum at the inflection point of the bridge unbalance vs frequency curve as shown by signal 80. Thus this method is a very sensitive measure of transition frequency. Signal 80 is then displayed by display 56.

If desired, and if a two dimensional scan is used, the output signal from amplifier 34 can be used to make a spatial image on a display (not shown) in either gray scale or color.

Figure 5:
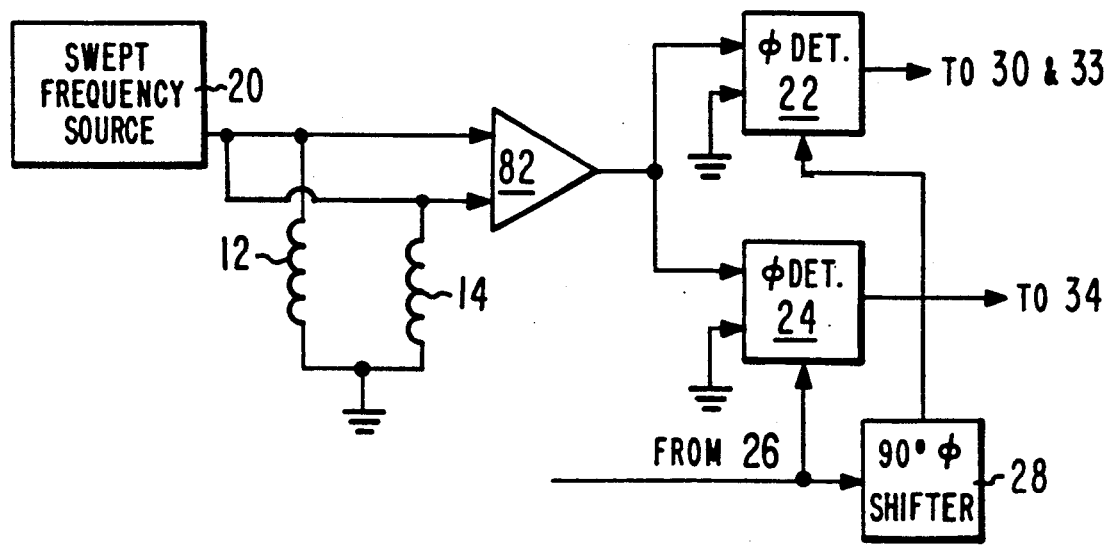
FIG. 5 is a partial block diagram of another embodiment of the invention.

It will be appreciated that the present invention provides a sensitive apparatus and method for measuring the thickness of a coating on a substrate even when the physical properties of the coating and substrate are small. It will be further appreciated that many other embodiments are possible within the spirit and scope of the invention. For example, as shown in FIG. 5, instead of being a part of a bridge circuit 10, (FIG. 1) probes 12 and 14 can be coupled to respective inputs of a difference amplifier 82 comparing means. One input of each of the detectors 22 and 24 is coupled to the output of amplifier 82, while the remaining input of each of detectors 22 and 24 is grounded. The rest of the circuit is identical to that shown in FIG. 1. For example, as shown in FIG. 5, source 20 is connected to probes 12 and 14 as shown.

What is claimed is:

1. Apparatus for measuring the thickness of a coating on a substrate having a given substrate material, said apparatus comprising:
   means for generating variable frequency eddy currents in the coated substrate, the coating, and an uncoated substrate of the given material; and
   means for comparing conductivity changes of the coating and the coated substrate with the uncoated substrate with changes in frequency and for determining a transition frequency, the transition frequency being related to the coating thickness and being a frequency at which current flow transitions substantially between penetration and no penetration into the substrate.

2. The apparatus of claim 1 wherein said comparing means comprises means for detecting phase differences between said eddy currents.

3. The apparatus of claim 1 wherein said generating means comprises a pair of probe first and second coils adapted to be respectively disposed proximate the coated and uncoated substrates.

4. The apparatus of claim 3 wherein said generating means comprises a bridge circuit including said first and second coils.

5. The apparatus of claim 4 wherein said bridge circuit further includes third and fourth coils.

6. The apparatus of claim 3 wherein said comparing means includes a difference amplifier having a pair of inputs respectively coupled to said coils.

7. The apparatus of claim 1 wherein said generating means includes an oscillator that sweeps between about 10 KHz to 10 MHz.

8. The apparatus of claim 1 further comprising a display means coupled to said comparing means.

9. The apparatus of claim 1 further comprising a regression analysis circuit coupled to said comparing means, and a thickness versus frequency memory coupled to said analysis circuit.

10. The apparatus of claim 9 wherein said analysis circuit is a least squares circuit.

11. The apparatus of claim 9 wherein said analysis circuit is a maximum likelihood circuit.

12. The apparatus of claim 1 further comprising a first differentiator coupled to said comparing means, a second differentiator coupled to said first differentiator, and a ratio circuit coupled to both of said differentiators.

13. Apparatus or measuring the thickness of a coating on a substrate having a given substrate material, said apparatus comprising:
   a pair of probe first and second coils adapted to be disposed respectively proximate the coated substrate and an uncoated substrate of the given material;
   a swept frequency oscillator coupled to said coils; and
   means coupled to said coils and to said oscillator, for comparing conductivity changes of the coating and the coated substrate with the uncoated substrate with changes in frequency and for determining a transition frequency, the transition frequency being related to the coating thickness and being a frequency at which current flow substantially transitions between penetration and no penetration into the substrate.

14. The apparatus of claim 13 further comprising the coated and the uncoated substrates.

15. The apparatus of claim 14 wherein each of said substrates comprises zircalloy, and said coating comprises zirconium.

16. The apparatus of claim 13 further comprising a bridge circuit including said probe coils.

17. The apparatus of claim 16 wherein said bridge circuit includes third and fourth coils respectively coupled to said first and second coils.

18. The apparatus of claim 13 wherein said swept frequency oscillator sweeps between about 10 KHz to 10 MHz.

19. The apparatus of claim 13 wherein said comparison means comprises a first phase detector coupled to said coils, said first detector being coupled to said oscillator.

20. The apparatus of claim 19 further comprising a second phase detector coupled to said coils, and a 90 degree phase shifter coupled between said oscillator and said second detector.

21. The apparatus of claim 20 further comprising a phase adjustment means having an input coupled to said oscillator and an output coupled to said first detector and said phase shifter.

22. The apparatus of claim 20 further comprising a servo circuit coupled to said second detector and mechanically coupled to said coil disposed proximate said coated substrate.

23. The apparatus of claim 13 wherein said comparison means comprises a differential amplifier having a pair of inputs respectively coupled to said coils.

24. A method for measuring the thickness of a coating on a substrate having a give substrate material, said method comprising:
   generating variable frequency eddy currents in the coated substrate, the coating, and an uncoated substrate of the given material; and
   comparing changes in conductivity of the coating and the coated substrate with the uncoated substrate with changes in frequency in order to determine a transition frequency, the transition frequency being related to coating thickness and being a frequency at which current flow substantially transitions between penetration and no penetration into the substrate.

25. The method of claim 24 wherein said comparing step comprises detecting phase differences between said eddy currents.

26. The method of claim 24 wherein said generating step comprises generating a frequency that sweeps between about 10 KHz to 10 MHz.

27. The method of claim 24 further comprising displaying the compared eddy currents.

28. The method of claim 24 further comprising calculating a transition frequency, and determining the thickness from said transition frequency.

29. The method of claim 28 wherein said calculating step comprises the least squares method.

30. The method of claim 28 wherein said calculating step comprises the maximum likelihood method.

31. The method of claim 24 further comprising calculating the first derivative of a signal representing the compared conductivity changes, calculating second derivative of said signal, and calculating the ratio of the first to the second derivatives.

32. The method of claim 24 further comprising performing a phase adjustment for maximum sensitivity.

33. The method of claim 24 further comprising performing a calibration using a substrate having a coating of known thickness.

* * * * *